Patented May 1, 1951

2,550,705

UNITED STATES PATENT OFFICE 2,550,705

METHOD FOR OBTAINING PECTINIC ACIDS OF LOW METHYL ESTER CONTENT IN CONCENTRATED FORM

William D. Maclay, Berkeley, Allan D. Shepherd, El Cerrito, Rolland M. McCready, Berkeley, and Robert P. Graham, Albany, Calif., assignors to United States of America as represented by the Secretary of Agriculture No Drawing. Application November 12, 1946, Serial No. 709,106

14 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to pectin materials and has among its objects the provision of a process for preparing pectinic acids of low methyl ester content. A further object is the preparation of such pectinic acids in concentrated form without the use of vacuum concentration or organic solvents and with a great saving in amounts of reagents necessary.

The process of preparing low-methoxyl pectinic acids from pectin is known. In the known process the deesterification is generally carried out on the solution of pectin obtained by extraction of pectin-containing materials or on the solution containing the pectin source materials. Such solutions have a pectin concentration of about 0.3 to 1%. Pectin cannot be extracted from pectin-containing materials, such as citrus peel or apple pomace, in higher concentration because of the formation of very viscous solutions. Thus if it is attempted to prepare a pectin extract of concentration higher than that referred to, it is found that the resulting liquid is so viscous that it cannot be filtered and thus the undesired material (cellulose-pulp, etc.) cannot be separated. The deesterification of pectin in such dilute solution is very wasteful of reactants. Excessive amounts of alkali or acid are necessary to bring the entire quantity of solution to the desired pH in the deesterification and isolation.

Further, the low-methoxyl pectinic acid product is then obtained in very low concentration and must be separated from excessive amounts of water.

It is known to carry out the de-methoxylation of pectin in more concentrated solutions but in such cases, vacuum concentration of the pectin solution was required or re-solution of dry pectin was involved.

According to the instant process, the dilute pectin extract can be used as the starting material and yet the de-methoxylation is carried out on more concentrated solutions. To this end the dilute pectin extract having a concentration of about 0.3 to 1.0% pectin is treated with a salt of a polyvalent metal. The pectin forms a salt (or a complex) with the polyvalent metal and said material precipitates out of solution. The precipitate is separated from the liquid phase, suspended in substantially pure water, and subjected to a de-methoxylation procedure. The precipitation step involves a rapid and very economical concentration step. Thus the pectin extract may have a concentration of about 0.3 to 1% but when the pectin-polyvalent metal composition is suspended in water for the de-methoxylation step, only enough water is added to give an effective concentration of about 5% or above of pectin. In operating on such a concentrated solution there is a large saving in alkali and/or acid in the de-methoxylation and isolation steps, the low-methoxyl pectinic acid product is more easily recovered, and when precipitated from such solution has improved physical characteristics from the standpoint of increased solids content. Further, in carrying out the de-methoxylation under alkaline conditions, low temperatures are advantageous. In such case there is a considerable saving in refrigeration cost when the more concentrated solution is treated.

As has been pointed out, the process is of particular advantage when starting with a dilute pectin extract. However, the de-methoxylation of pectin-polyvalent metal compositions is a novel step in and of itself and our invention is inclusive of de-methoxylating such compositions to produce low-methoxyl pectinic acids, regardless of how the compositions are prepared.

The pectin-polyvalent metal composition can be de-methoxylated by either an alkaline or an acid technique as will be shown hereinafter.

The step of preparing the pectin-metal compositions by reacting a solution of pectin with a polyvalent metal salt is known; see for example, the following U. S. patents: 2,163,620, June 27, 1939; 2,163,621, June 27, 1939; 2,165,902, July 11, 1939; and 1,497,884, June 17, 1924. However, two examples are submitted to illustrate the technique we found to be advantageous. It is understood that these examples and those submitted hereinafter are given by way of illustration and not limitation.

Example 1

To 1 liter of 1% citrus pectin solution, 50 ml. of 25% $Al_2(SO_4)_3$ solution was added. After thorough stirring, 40 ml. of 4% ammonium hydroxide solution was added to give a pH of 4.2 to 4.5. The resulting precipitate of aluminum-pectin complex was strained and pressed to a solids content of 10%.

Example 2

Ten ml. of 15% $CuSO_4$ solution was added to 1 liter of 1% citrus pectin solution. After thorough mixing, 30 ml. of 4% ammonium hydroxide solution was added to bring the pH of the mixture to about 4.5. The resulting precipitate of copper pectinate was strained and pressed to a solids content of 10%.

The pectin-polyvalent metal compositions prepared as in Examples 1 and 2 are employed in the de-methoxylation step as illustrated by Examples 3 to 8. As will be shown hereinafter, pectin compositions can be prepared with many other metals besides copper and aluminum. The pectin-metal composition need not necessarily be made according to the technique shown in Examples 1 and 2 but can be made by any of the methods shown in the prior art.

Example 3

500 grams of aqueous aluminum-pectin precipitate (containing 45 gm. pectin) was screened through a 10-mesh screen. To this was added 500 ml. iced water and 50 ml. of concentrated ammonium hydroxide. The temperature of the resultant dispersion was 16° C., and its pH was 11.0. The temperature of 16° C. was maintained throughout the period of de-esterification. At the end of 3 hours, one-half of the batch (semi-fluid state) was treated with 15 ml. of concentrated sulfuric acid in 500 ml. of water which precipitated the low-methoxyl pectin. The precipitate was pressed, resuspended in 1% aqueous sulfuric acid, stirred thoroughly, and repressed. The press cake was shredded, washed twice in water to yield a final pH of 2.0–2.2, pressed and dried. Methoxyl content, 3.6%.

The second half of the batch, after 3½ hours, was precipitated and washed in the same manner as described for the first half. Methoxyl content, 3.3%.

Example 4

Two hundred grams of aqueous aluminum-pectin precipitate (17 grams pectin) was suspended in 400 ml. of chilled water, the reaction mixture titrated to a pH of 11.3, and maintained at above 11.0 by the addition of 1 N sodium hydroxide. The temperature was maintained at 15–17° C. At the end of 15 minutes, the pectinic acid was precipitated by stirring into a solution of sulfuric acid of pH 0.5. The isolated pectinic acid was washed twice in aqueous acid of pH 1.0 and twice with water to a pH 2.4. It was dried at 65° C. in vacuo. Methoxyl content, 3.1%.

Example 5

Two hundred fifty grams aqueous aluminum-pectin precipitate (8.65% pectin) was mixed with 400 ml. of water and 40 ml. of concentrated hydrochloric acid added to yield a reaction mixture pH of about 0.4. The reaction mixture was maintained at 120° F. for 70 hours, the same having set to a stiff gel at the end of the pectination period. The gel was broken up and precipitated pectinic acid was pressed, washed to remove excess acid, and dried. Methoxyl content 2.33%.

Example 6

Three hundred seventy grams of aqueous copper pectinate precipitate (7.65% pectin) was screened through a 10-mesh screen. To this was added 370 ml. of cold water and 45 ml. of concentrated ammonium hydroxide. The temperature of the reaction mixture was 18° C., and its pH was 11.0. The reaction mixture was allowed to stand for 2¼ hours, at the end of which time, it was precipitated by slowly adding, in the form of a fine stream, to 500 ml. of sulfuric acid solution (pH 0.5). The precipitated pectinic acid was drained, pressed, shredded, and washed twice in water acidified to a pH of 1.0 and three times with water, the final wash mixture having a pH of about 2.5. The pressed, washed precipitate was dried at 65° C. Methoxyl content, 2.2%.

Example 7

To 200 grams of aqueous copper pectinate precipitate (7.65% pectin) was added 400 ml. of cold water to yield a reaction mixture temperature of 15° C. Sodium hydroxide solution (1 N) was added, with stirring, to effect a pH of 11.3, and additional alkali was added at a rate such that a pH of 11.0–11.1 was maintained. At the end of 15, 20, and 25 minute intervals, one-third each of the reaction mixtures was acidified to a pH of 1.5 by adding to 200-ml. volumes of dilute sulfuric acid (pH 0.5). The acid-precipitated pectinic acids were washed twice at a pH of 1.0 and twice with water, the pH of the final wash mixture being above 2.0, pressed and dried. Methoxyl contents, 3.7, 3.3, and 3.2%, respectively.

Example 8

Two hundred fifty grams of aqueous copper pectinate precipitate (7.65% pectin), screened through a 10-mesh screen, was mixed with 400 ml. of water, and 30 ml. of concentrated hydrochloric acid was added to give a reaction mixture pH of about 0.4. The reaction mixture was maintained at 120° F. for 70 hours, the same having set to a stiff gel at the end of the pectination period. The gel was broken up, pressed, washed three times with water, the pH of the final wash being about 2.2. The pectinic acid was then pressed and dried in vacuo at 65° C. Methoxyl content, 2.33%.

The concentration of pectin-polyvalent metal composition in the de-methoxylation step may vary within wide limits. It is preferred to use concentrations equivalent to 1% or greater of pectin, particularly 3% to 10%.

In the case of the alkaline hydrolysis, various bases, such as sodium hydroxide, potassium hydroxide, ammonium hydroxide, ammonia gas, etc., may be used to effect alkaline de-methoxylation.

In the case of acid hydrolysis, various acids such as hydrochloric, sulphuric, and phosphoric, may be used to effect the de-methoxylation.

A wide range of temperature, depending upon the type of de-methoxylation, may be used in the de-methoxylation process. In general, the temperature ranges used when pectin solutions are de-methoxylated by acid or alkali are applicable in method of this invention, i. e., from about 10° C. to about 60° C. In the case of the acid hydrolysis technique, temperatures of about 40° C. to about 60° C. are particularly effective. In the case of the alkaline modification, temperatures from about 10° C. to about 17° C. are particularly effective.

In the acid de-methoxylation technique, a pH range of from about 0.3 to about 0.5 gives good results. In the alkaline modification, a pH range from about 10.5 to about 12 gives good results.

The polyvalent-metal salt used to form the pectin salt (or complex) may be any water-soluble salt of a polyvalent metal which polyvalent metal is capable of forming a water-insoluble composition with pectin. That is, first, the salt must be water-soluble and second, the cation must be one which forms a water-insoluble salt or complex with pectin. Since it is not always clear whether a salt or a complex is formed, these insoluble pectin-polyvalent precipitates are referred to as "pectin-polyvalent metal compositions" in this specification. It has been found that any water-soluble salt of copper, aluminum, ferric iron, nickel, cobalt, lead, mercury, etc. can be used. Such salts as copper sulphate, cupric chloride, ferric sulphate, aluminum sulphate, nickel nitrate, etc. are suitable. The formation of the pectin-polyvalent metal composition is in the nature of a simple metathesis and proportions of reagents and temperature are not critical. When preparing the aluminum-pectin complex, a pH of 4.2 to 4.5 must be maintained to get the proper precipitation. With the other metals mentioned above, the pH is not critical. However, it has been found that increasing the pH to about 4.0 to 4.5 gives more complete precipitation.

The step of precipitating pectinic acids from solution by the addition of acid is disclosed and claimed in the application of R. M. McCready, H. S. Owens, and W. D. Maclay, Serial No. 616,445, filed September 14, 1945, Patent No. 2,448,818.

Having thus described our invention, we claim:

1. A process for preparing low-methoxyl pectinic acids from a dilute aqueous solution of pectin which comprises mixing with said solution a water-soluble salt of a polyvalent metal, separating the precipitated pectin-polyvalent metal composition, dispersing it in substantially pure water, subjecting the dispersion to the action of a de-methoxylating agent to form low-methoxyl pectinic acids, and isolating the low-methoxyl pectinic acids so formed.

2. A process for preparing low-methoxyl pectinic acids from a dilute aqueous solution of pectin which comprises mixing with said solution a water-soluble salt of a polyvalent metal, separating the precipitated pectin-polyvalent metal composition, dispersing it in substantially pure water, subjecting the dispersion to de-methoxylation in the presence of a mineral acid at a pH of about 0.4 to form low-methoxyl pectinic acids, and precipitating the low-methoxyl pectinic acids so formed.

3. A process for preparing low-methoxyl pectinic acids from a dilute aqueous solution of pectin which comprises mixing with said solution a water-soluble salt of a polyvalent metal, separating the precipitated pectin-polyvalent metal composition, dispersing it in substantially pure water, subjecting the dispersion to de-methoxylation in the presence of a base at a pH of about 11 to form low-methoxyl pectinic acids, and precipitating the low-methoxyl pectinic acids so formed by the addition of a mineral acid.

4. A process for preparing low-methoxyl pectinic acids from a dilute aqueous solution of pectin which comprises mixing a water-soluble copper salt with said solution, separating the precipitated copper pectinate, dispersing it in substantially pure water, subjecting the dispersion to de-methoxylation in the presence of a mineral acid at a pH of about 0.4 to form low-methoxyl pectinic acids, and precipitating the low-methoxyl pectinic acids so formed.

5. A process for preparing low-methoxyl pectinic acids from a dilute aqueous solution of pectin which comprises mixing a water-soluble copper salt with said solution, separating the precipitated copper pectinate, dispersing it in substantially pure water, subjecting said dispersion to de-methoxylation in the presence of a base at a pH of about 11 to form low-methoxyl pectinic acids, and precipitating the low-methoxyl pectinic acids so formed by the addition of a mineral acid.

6. A process for preparing low-methoxyl pectinic acids from a dilute aqueous solution of pectin which comprises mixing a water-soluble aluminum salt with said solution, separating the precipitated aluminum-pectin composition, dispersing it in substantially pure water, subjecting said dispersion to de-methoxylation in the presence of a base at a pH of about 11 to form low-methoxyl pectinic acids, and precipitating the low-methoxyl pectinic acids so formed by addition of a mineral acid.

7. A process for preparing low-methoxyl pectinic acids from a dilute aqueous solution of pectin which comprises mixing a water-soluble aluminum salt with said solution, separating the precipitated aluminum-pectin composition, dispersing it in substantially pure water, subjecting said dispersion to de-methoxylation in the presence of ammonium hydroxide at a pH of about 11 at a temperature of about 16° C. to form low-methoxyl pectinic acids, and precipitating the low-methoxyl pectinic acids so formed by the addition of sulphuric acid.

8. A process for preparing low-methoxyl pectinic acids which comprises dispersing a water-insoluble pectin-polyvalent metal composition in substantially pure water, subjecting the dispersion to the action of a de-methoxylating agent to form low-methoxyl pectinic acids, and isolating the low-methoxyl pectinic acids so formed.

9. A process for preparing low-methoxyl pectinic acids which comprises subjecting a dispersion of a water-insoluble pectin-polyvalent metal composition in substantially pure water to the action of a mineral acid to de-methoxylate the pectin and form low-methoxyl pectinic acids, and isolating the low-methoxyl pectinic acids so formed.

10. A process for preparing low-methoxyl pectinic acids which comprises subjecting a dispersion of a water-insoluble pectin-polyvalent metal composition in substantially pure water to the action of an alkali to de-methoxylate the pectin and form low-methoxyl pectinic acids, and isolating the low-methoxyl pectinic acids so formed.

11. A process for preparing low-methoxyl pectinic acids which comprises subjecting a dispersion of copper pectinate in substantially pure water to de-methoxylation in the presence of a mineral acid at a pH of about 0.4 to form low-methoxyl pectinic acids, and isolating the low-methoxyl pectinic acids so formed.

12. A process for preparing low-methoxyl pectinic acids which comprises subjecting a dispersion of copper pectinate in substantially pure water to de-methoxylation in the presence of an alkali at a pH of about 11 to form low-methoxyl pectinic acids, and precipitating the low-methoxyl pectinic acids so formed by the addition of a mineral acid.

13. A process for preparing low-methoxyl pectinic acids which comprises subjecting a dispersion of aluminum-pectin complex in substantially pure water to de-methoxylation in the presence of an alkali at a pH of about 11 to form low-methoxyl pectinic acids, and precipitating the low-methoxyl pectinic acids so formed by the addition of a mineral acid.

14. A process for preparing low-methoxyl pectinic acids which comprises subjecting a dispersion of aluminum-pectin complex in substantially pure water to de-methoxylation in the presence of ammonium hydroxide at a pH of about 11 and a temperature of about 16° C. to form low-methoxyl pectinic acids, and precipitating the low-methoxyl pectinic acids so formed by the addition of a mineral acid.

WILLIAM D. MACLAY.
ALLAN D. SHEPHERD.
ROLLAND M. McCREADY.
ROBERT P. GRAHAM.

REFERENCES CITED

The following references are of record in the file of this patent:

UNITED STATES PATENTS

| Number | Name | Date |
|---|---|---|
| 2,132,577 | Olsen | Oct. 11, 1938 |
| 2,163,620 | Myers | June 27, 1939 |
| 2,233,574 | Baker | Mar. 4, 1941 |
| 2,300,651 | Cole et al. | Nov. 3, 1942 |
| 2,349,138 | Bryant | May 16, 1944 |
| 2,373,729 | Willaman | Apr. 17, 1945 |